(12) United States Patent
Hassan et al.

(10) Patent No.: US 11,089,449 B2
(45) Date of Patent: Aug. 10, 2021

(54) EMERGENCY TEXT LOCATION ENHANCEMENT

(71) Applicant: Microsoft Technology Licensing, LLC, Redmond, WA (US)

(72) Inventors: Amer Aref Hassan, Kirkland, WA (US); Michael J. Davis, Seattle, WA (US); Ashley Ingram, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/515,273

(22) Filed: Jul. 18, 2019

(65) Prior Publication Data

US 2021/0021969 A1 Jan. 21, 2021

(51) Int. Cl.
| | |
|---|---|
| H04W 4/029 | (2018.01) |
| H04W 4/14 | (2009.01) |
| H04W 4/90 | (2018.01) |
| G06F 16/2457 | (2019.01) |
| G06F 16/29 | (2019.01) |
| H04W 4/02 | (2018.01) |

(52) U.S. Cl.
CPC ........ *H04W 4/14* (2013.01); *G06F 16/24578* (2019.01); *G06F 16/29* (2019.01); *H04W 4/025* (2013.01); *H04W 4/029* (2018.02); *H04W 4/90* (2018.02)

(58) Field of Classification Search
CPC ....... H04W 4/14; H04W 4/029; H04W 4/025; H04W 4/90; H04W 4/02; H04W 4/22; G06F 16/24578; G06F 16/29
See application file for complete search history.

(56) References Cited

U.S. PATENT DOCUMENTS

| | | | |
|---|---|---|---|
| 2012/0136923 A1* | 5/2012 | Grube | H04W 4/021 709/203 |
| 2014/0045523 A1* | 2/2014 | Singh | H04W 4/029 455/456.1 |
| 2014/0199959 A1 | 7/2014 | Hassan et al. | |
| 2014/0334346 A1 | 11/2014 | Stephens et al. | |
| 2018/0199179 A1* | 7/2018 | Rauner | G08B 25/10 |

OTHER PUBLICATIONS

"International Search Report and Written Opinion Issued in PCT Application No. PCT/US20/034765", dated Aug. 14, 2020, 11 Pages.

* cited by examiner

*Primary Examiner* — Chuong A Ngo

(74) *Attorney, Agent, or Firm* — Schwegman Lundberg & Woessner, P.A.

(57) ABSTRACT

Systems and methods may be used for providing an emergency text service on a mobile device. These systems and methods may generate selectable indications with unique addresses and rank the selectable indications based on, for example, proximity of the mobile device to a probable location. Some systems and methods may display the ranked selectable indications on a user interface (e.g., on a display of the mobile device). An address may be inserted into the emergency text message when a selectable indication corresponding to the address is selected.

21 Claims, 11 Drawing Sheets

EMERGENCY TEXT LOCATION ENHANCEMENT

BACKGROUND

In traditional 911 or other emergency service calls, for example in the United States, a landline's location is automatically sent to a dispatcher receiving the call. In addition to landline emergency services, enhanced 911 (e.g., e911 or E112 in Europe) is available for aiding in location determination for an emergency call from a mobile device (e.g., a cell phone). Some jurisdictions now provide emergency service contacts via text message on a mobile device, often referred to as text-to-911. However, location data for a mobile device is sometimes unreliable, and obtaining precise or accurate location data may be difficult.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for providing emergency text services on a mobile device are described herein. These systems and methods may be used to provide address services or allow a user to more easily select an address when there is uncertainty about a location of a mobile device. As discussed above, precise or accurate location data for a mobile device may not be available or accurate. Some jurisdictions require or rely on a user to enter location information when sending a text to request emergency services or report an emergency. User entered addresses may be inaccurate or unreliable, for example due to reliance on the user's memory or issues with clearly remembering or typing (or using voice-to-text) during an emergency. Another issue that may arise with user entered addresses is that time is usually of the essence during emergencies, and manually entering an address may take a long time (e.g., when compared with the techniques presented herein).

The systems and methods described herein solve the technical issues involved with inaccuracy and timing of manual user entered addresses, while also avoiding the potential inaccuracies of an entirely automated location determination. These solutions may have the added benefit of complying with jurisdictional requirements that addresses not be automatically sent to emergency services without any user participation.

FIGS. 1A-1D illustrate an example mobile device for sending an address in an emergency text according to some examples of the present disclosure. The mobile device may include memory, a display, and one or more hardware processors.

Figure 1A:
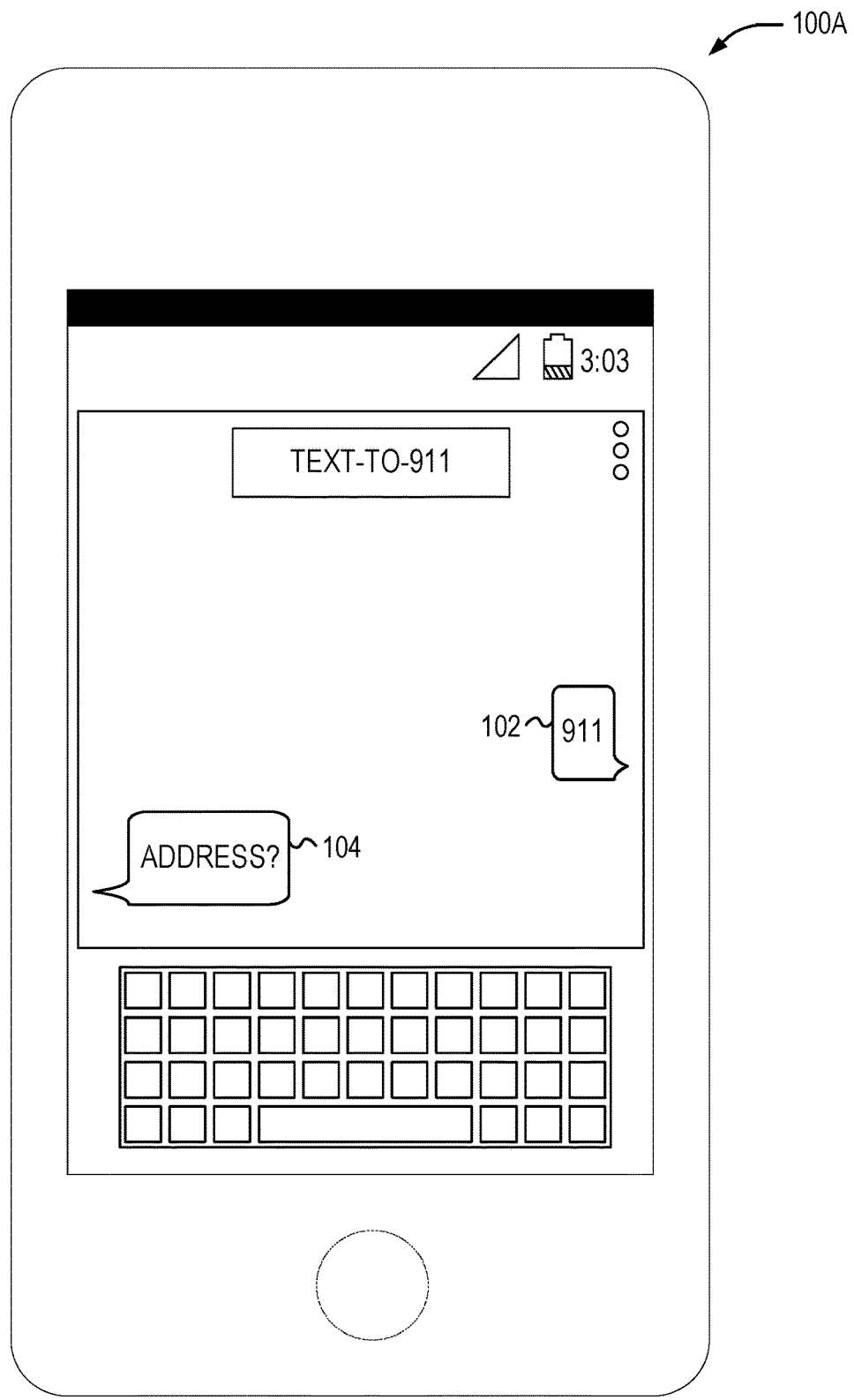
FIGS. 1A-1D illustrate an example mobile device for sending an address in an emergency text according to some examples of the present disclosure.

FIG. 1A illustrates the mobile device in a first state 100A where an example emergency text has been initiated. A message 102 may be sent to indicate that an emergency text has started. A response 104 may be sent from a dispatcher or automated emergency service asking for additional details (e.g., an address or location of the mobile device). The message 102 and response 104 are examples shown for ease of understanding the techniques described herein, but other indications of initiation of an emergency text or communications may be used. For example, entering the emergency text message number may be an indication that a message has been started. In an example, the response 104 may not be a text message (or may not be a text message viewable by a user or presented on a user interface) or may include information in addition to a text message. For example, the response 104 may include metadata, a data communication, or the like such that a request for additional information (e.g., an address or location) is identified by the mobile device, with or without the user's direct interaction.

Figure 1B:
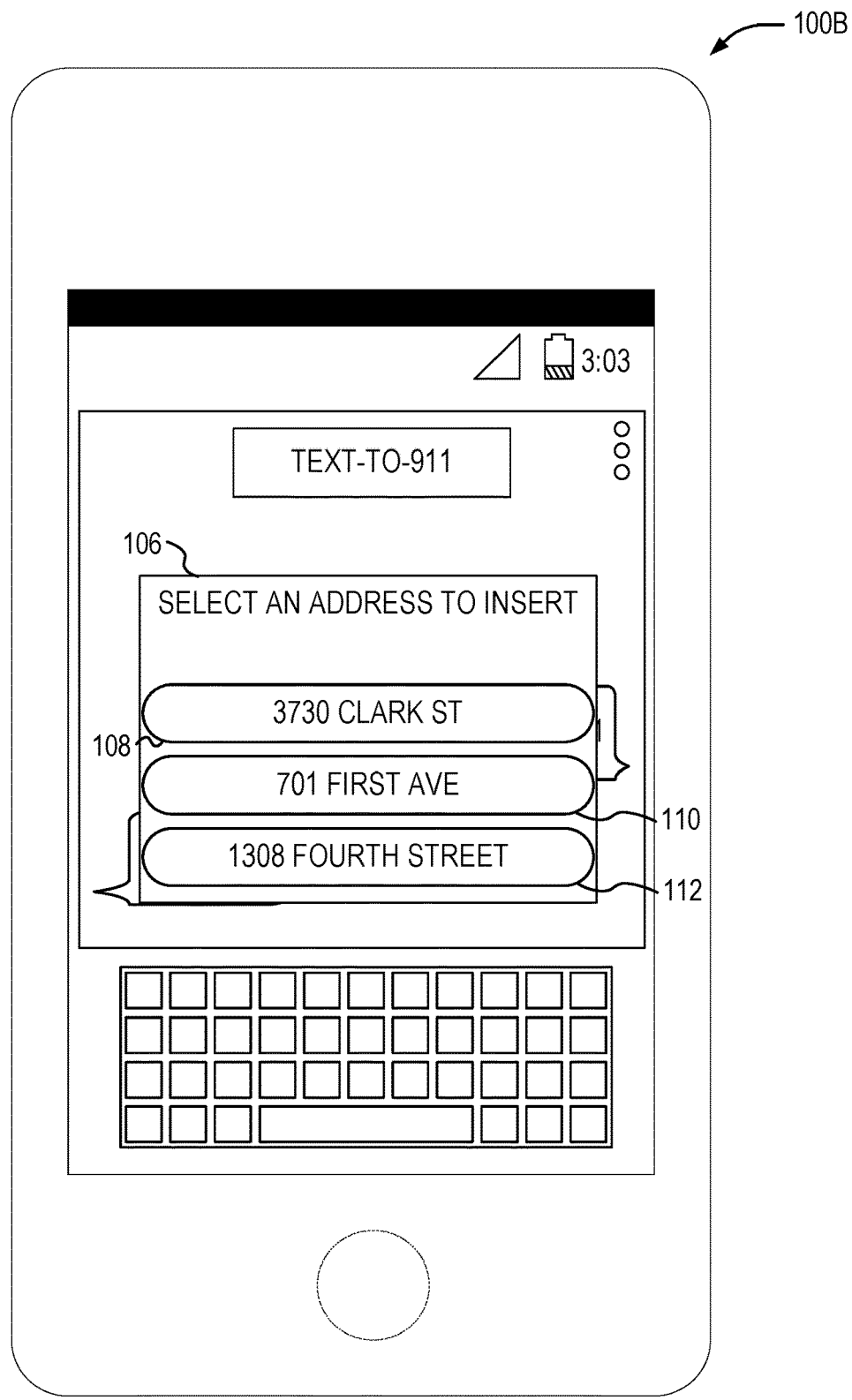

After the response 104 is received the mobile device may transition to a second state 100B as shown in FIG. 1B, by displaying an address selection menu 106 with one or more selectable indications (108, 110, 112) corresponding to one or more addresses. Though three selectable indications are shown in the figures, any number may be presented. For example, when only one or two likely locations are found, those may be presented. A default number may be generated, such as two, three, four, five, etc. An option may be presented to show more addresses when none of the addresses of the selectable indications 108, 110, and 112 is selected by the user.

Each selectable indication (108, 110, 112) may include an address generated from previously user entered addresses, from automatic location data of the mobile device (e.g., GPS, an address of a device connected to the mobile device including an access point (AP) or an Evolved Terrestrial Radio Access Network (E-UTRAN) node B (eNodeB), RFID, other mobile devices nearby, geofencing information, NFC, or the like), or from a combination. An address generated from a combination of automatic and user entered addresses may include searching for user generated addresses that are within a proximity range of an estimated location of the mobile device. Another combination may include a partially entered address by a user that is completed using location data (e.g., from a map database or app). For example, if the user has entered 101 First Ave, a compass direction, a city, a state, or a zip code may be added based on location data.

Figure 1C:
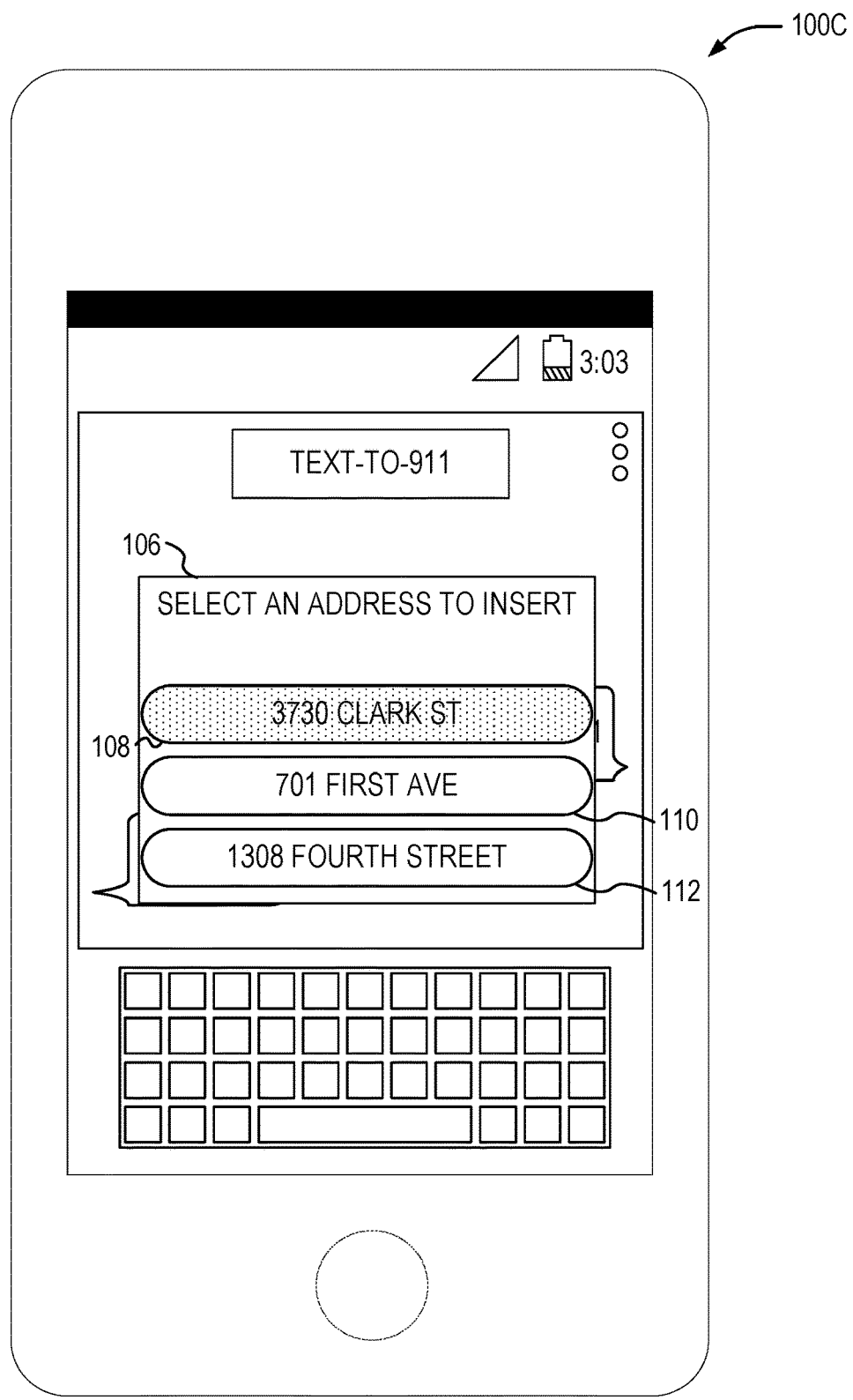
Figure 1D:
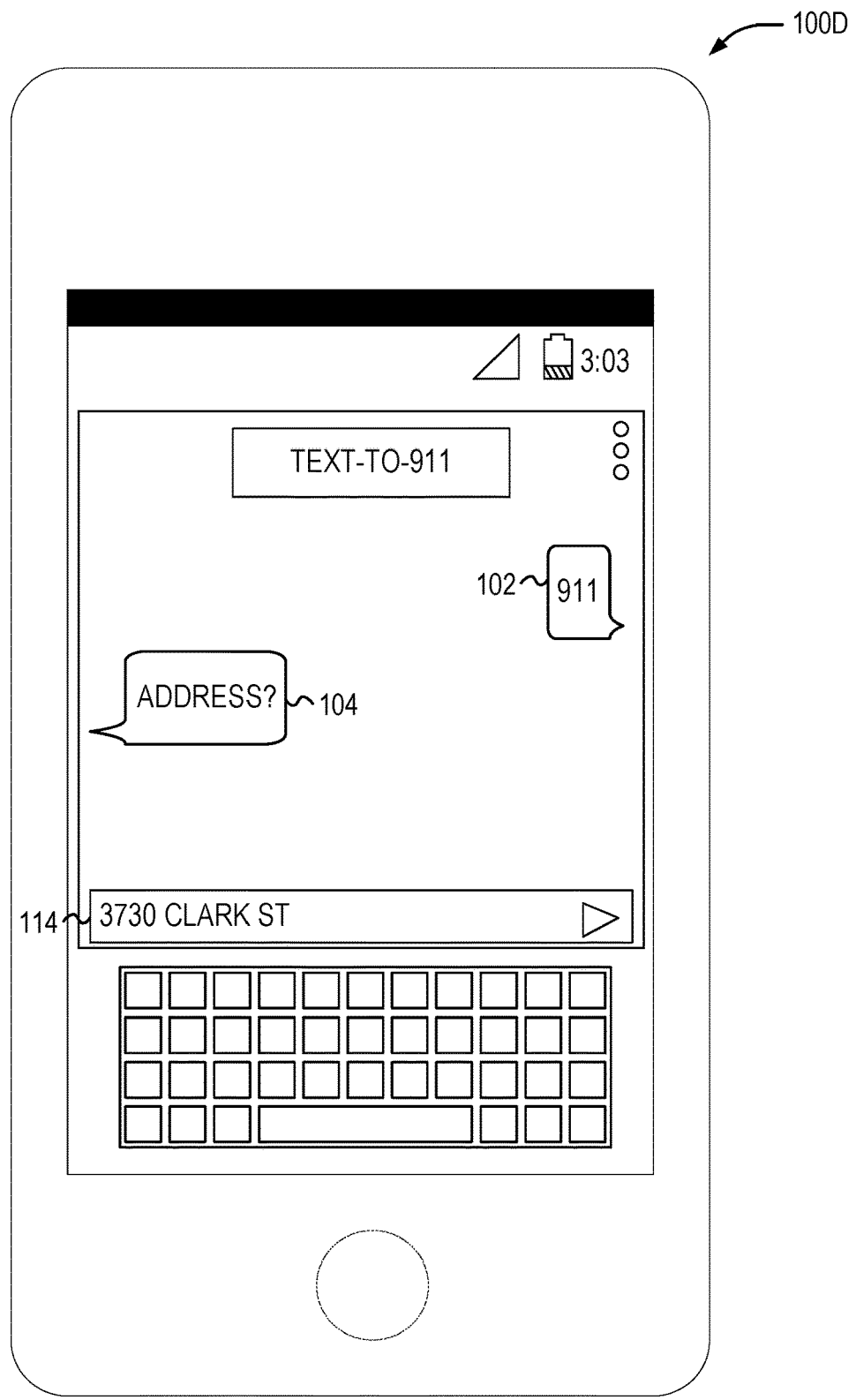

A user may select one of the selectable indications (108, 110, 112), shown in FIG. 1C with selectable indication 108 selected in a third state 100C. In response to the user selection of the selectable indication 108, the mobile device may automatically use the address corresponding to the selectable indication 108. Using the address may include automatically sending the address (via the emergency text), verifying the address, storing the address, or populating the address into an editable field of a user interface corresponding to text that may be sent via the emergency text (e.g., with user confirmation or after user edits). This last example is shown in FIG. 1D with the mobile device in a fourth state 100D. The selected address is entered into editable field 114. From there, the user may further edit the address or may send the address.

Returning to FIG. 1B, the addresses displayed in the selectable indications 108, 110, and 112 may be obtained using a variety of sources or techniques. For example, an address for one or more of the selectable indications 108, 110, and 112 may be obtained based on a user's preselected addresses. These addresses may be stored specifically for the purpose of using them in an emergency services message or may be stored more generally (e.g., a home address, a work address, etc.).

In another example, the address for one or more of the selectable indications 108, 110, and 112 may be generated from location data received at the mobile device. The location data may be generated from communication with a device having a known location (e.g., a static device) or a device having a likely address (e.g., another mobile device, which may be used to compare to the mobile device's own location data, for example from GPS, to verify, for example when both mobile devices have matching addresses, the likelihood of that probable location increases). Example devices the mobile device may communicate with include an access point (e.g., a WiFi access point), an eNodeB or other base station for communicating over a wireless network, a GPS satellite, a geofence, an RFID or NFC device, a Bluetooth device, a desktop computer, a smart device (e.g., a thermostat, refrigerator, home security system, etc.), a printer, or the like.

In yet another example, an address corresponding to one or more of the selectable indications 108, 110, and 112 may be derived from a saved place or an often frequented place, such as based on data from a map app or location services of the mobile device. For example, the user may keep a home or work address in a map app. In an example, the address of the mobile device may be inferred from map app data. For example, when the mobile device has two or more probable locations, one may be selected based on user data, such as a to be visited or starred address on a map app, a home or work address, an address stored in a contact list, an address associated with a calendar appointment for a current time, or the like.

The addresses of the selectable indications 108, 110, and 112 may be ranked. The selectable indications 108, 110, and 112 may be displayed in an order (e.g., order from top to bottom or left to right) according to the ranking. In an example, the displayed order may be changed when the ranking changes (e.g., when more reliable or additional location data is received or when the mobile device moves). The ranking may be based on a probable location of the mobile device, which may be determined based on location data of the mobile device (e.g., GPS, AP or eNodeB location, etc.) or user data (e.g., a frequent location, a saved location, calendar data, etc.), as described above. By displaying the addresses of the selectable indications 108, 110, and 112 in a ranked order, the user may be more likely to quickly select the correct address.

The ranking may be based on proximity of the addresses of the selectable indications 108, 110, and 112 to the probable location of the mobile device (e.g., based on user data or location data as described above). The closest selectable indication may be ranked first, the next most proximate may be ranked second, and so on. The ranked addresses may be displayed on a user interface of the mobile device (e.g., overlaid on the emergency services message thread. The addresses of the selectable indications 108, 110, and 112 need not be displayed strictly according to the ranking, but may be based on the ranking. For example, selectable indication 108 may be a home address saved by the user regardless of the proximity of the home address to the mobile device, while selectable indications 110 and 112 may include proximate addresses. Other defaults or alterations to the ordered display of the addresses of the selectable indications 108, 110, and 112 may be used, such as according to the technical needs of the particular emergency text service, user preferences, or device capabilities. For example, a highest ranked address may appear first, followed by a home address or work address, followed by other ranked addresses or other saved addresses. In some examples, ranked addresses may appear above or below a home address or other saved address based on the probability that the ranked addresses are the correct location of the mobile device. For example, when multiple addresses, which are determined to be proximate, are not themselves proximate (to each other), a lower level of probability may be assigned than, for example a situation where multiple location data sources (e.g., an AP and GPS) confirm a single address. These types of scenarios may be used to apply probabilities or rank the addresses.

As described above with respect to FIG. 3, the ranking may be used to color code the selectable indications 108, 110, and 112. In the color coded example, the ranking may or may not be used to order the selectable indications 108, 110, and 112. The colors may be updated as the ranking changes.

Figure 2:
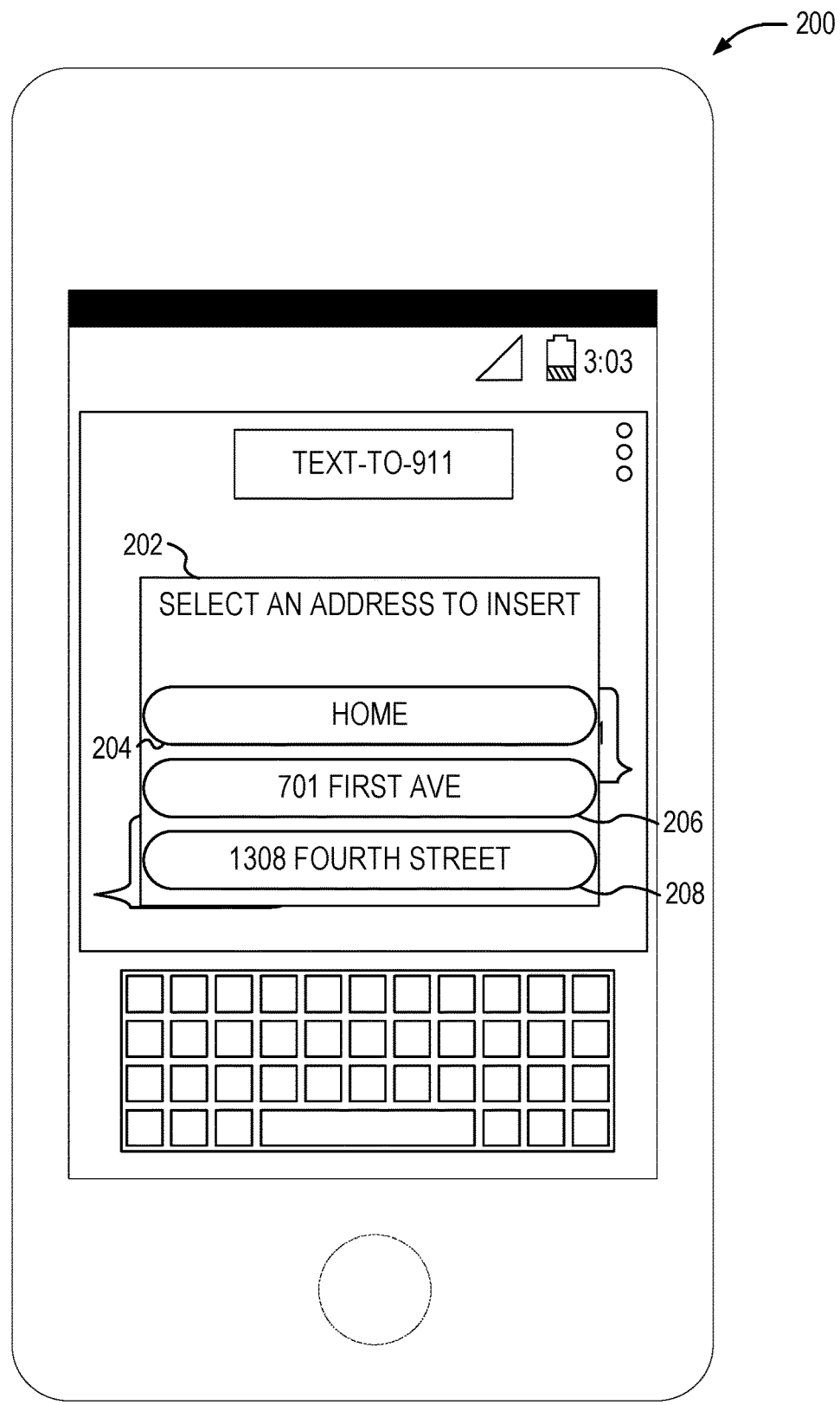
FIG. 2 illustrates an example mobile device for sending a suggested address in an emergency text according to some examples of the present disclosure.

FIG. 2 illustrates an example mobile device for sending a suggested address in an emergency text according to some examples of the present disclosure.

The mobile device shows a state 200 where a home address 204 is used in addition to other identified addresses 206 and 208 in an address selection component 202. The addresses 206 and 208 may be ordered according to a ranking, for example, and with the home address 204 ordered above the other addresses 206 and 208. The home address 204 may be determined from user data, such as a saved home contact, a saved location in a map app, a most frequented location (e.g., at night) from location data, a user identified home address (e.g., in storage for emergency services texting purposes or otherwise), or the like.

In an example, the home address 204 may optionally show the address, or may say home or both. In another example, more than one home address may be displayed when more than one potential home address is identified in user data or location data.

Though the address is shown as a home address in FIG. 2, another default address may be used, such as a work address, school address, etc. The user may configure a default top address for display or the address may display by default automatically. The home address 204 may be displayed at the end of the ordered list of addresses, in the middle, setoff from the other addresses, color coded differently, or the like, such as to distinguish that the home address 204 is not necessarily in proximity to the mobile device at a current time, but is provided by default or according to user preferences. Selection of the home address 204 may proceed as described above with respect to FIGS. 1A-1D as if the home address 204 were any other address, or a confirmation may appear requiring the user to confirm that the home address 204 is to be used. The confirmation may be contingent on determining that the home address 204 is not proximate (e.g., not within a particular range) to the mobile device. The warning described with respect to FIGS. 4A-4B may be presented when the home address 204 is selected but is determined to not be proximate to the mobile device.

Figure 3:
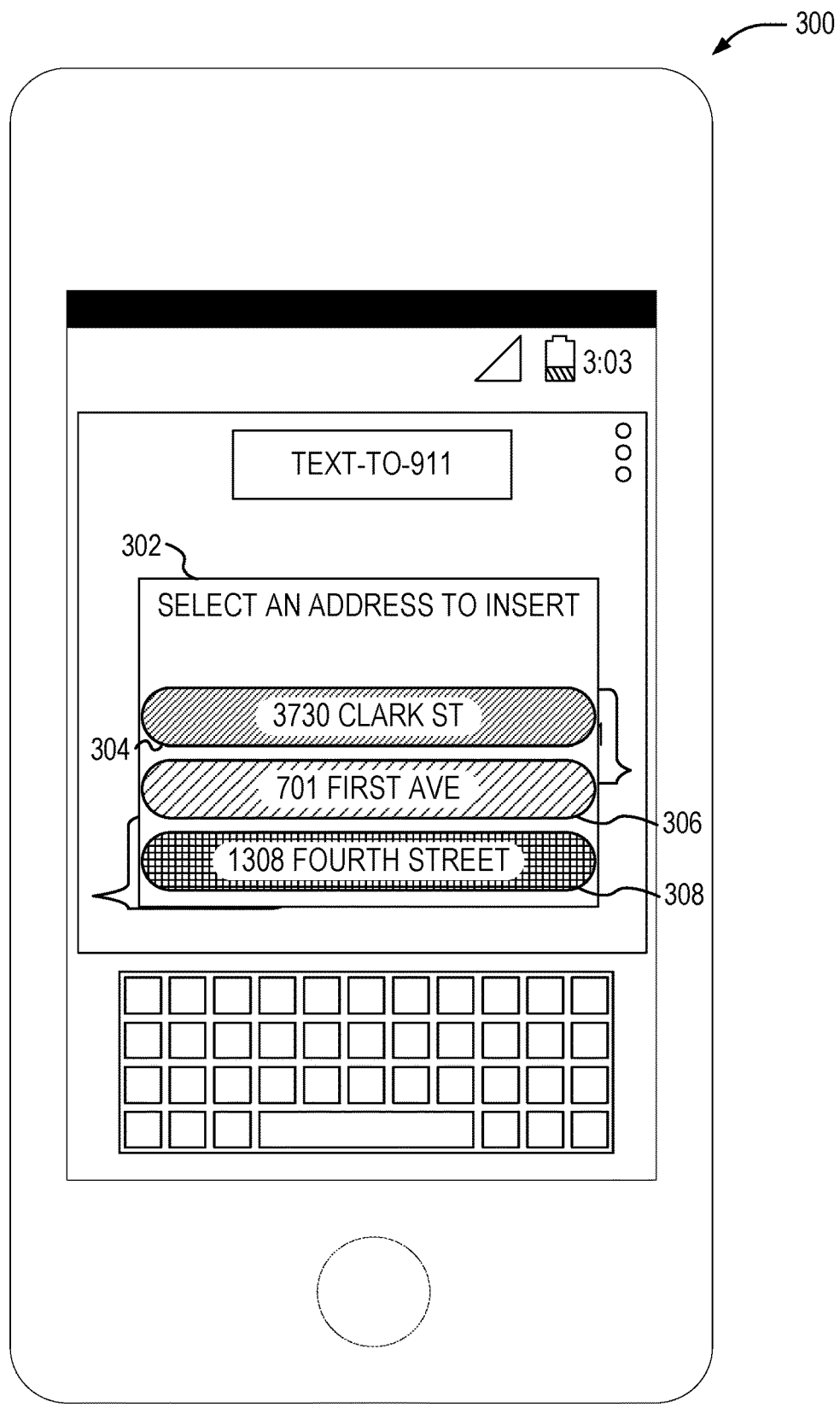
FIG. 3 illustrates an example mobile device for display ranked addresses for use in an emergency text according to some examples of the present disclosure.

FIG. 3 illustrates an example mobile device for display ranked addresses for use in an emergency text according to some examples of the present disclosure.

The mobile device in FIG. 3 is in a state 300 illustrating a color coding of selectable indications 304, 306, and 308 within an address selection component 302. The color coding may be based on a ranking of addresses corresponding to the selectable indications 304, 306, and 308. The ranking is described above in more detail.

In an example, each address may be assigned a color. For example, indication 304 may be green, indicating a highly probable address, indication 306 may be yellow, indicating a possible location, and indication 308 may be red, indicating a low probability location. In another example, only two colors may be used, such as a highest ranked address in green, and other addresses in red, or addresses in proximity of the mobile device in green and addresses outside the proximity (e.g., a home address, when automatically shown) in red. Other colors may be used as well. For example, shades of a color or colors may be used. Shades of colors may include shades of green for a highest ranked address (e.g., darker green for more likely, and lighter green for less likely) and red for one or more other addresses (e.g., darker red for less likely and lighter red for more likely), or a single color may be used with shades representing proximity. Other color coding may be used, such as one color for a highest ranked address, a second color for a preselected address (e.g., a home address that is displayed regardless of proximity), or the like. Color coding may be used to provide information on previously visited or entered addresses, versus never visited or never entered addresses. The color coding described herein may be used to provide a user with an intuitive user interface and selectable indications that do not need further explanation (e.g., do not necessarily, but may, display proximity distance, probabilities of likely addresses, etc.).

Figure 4A:
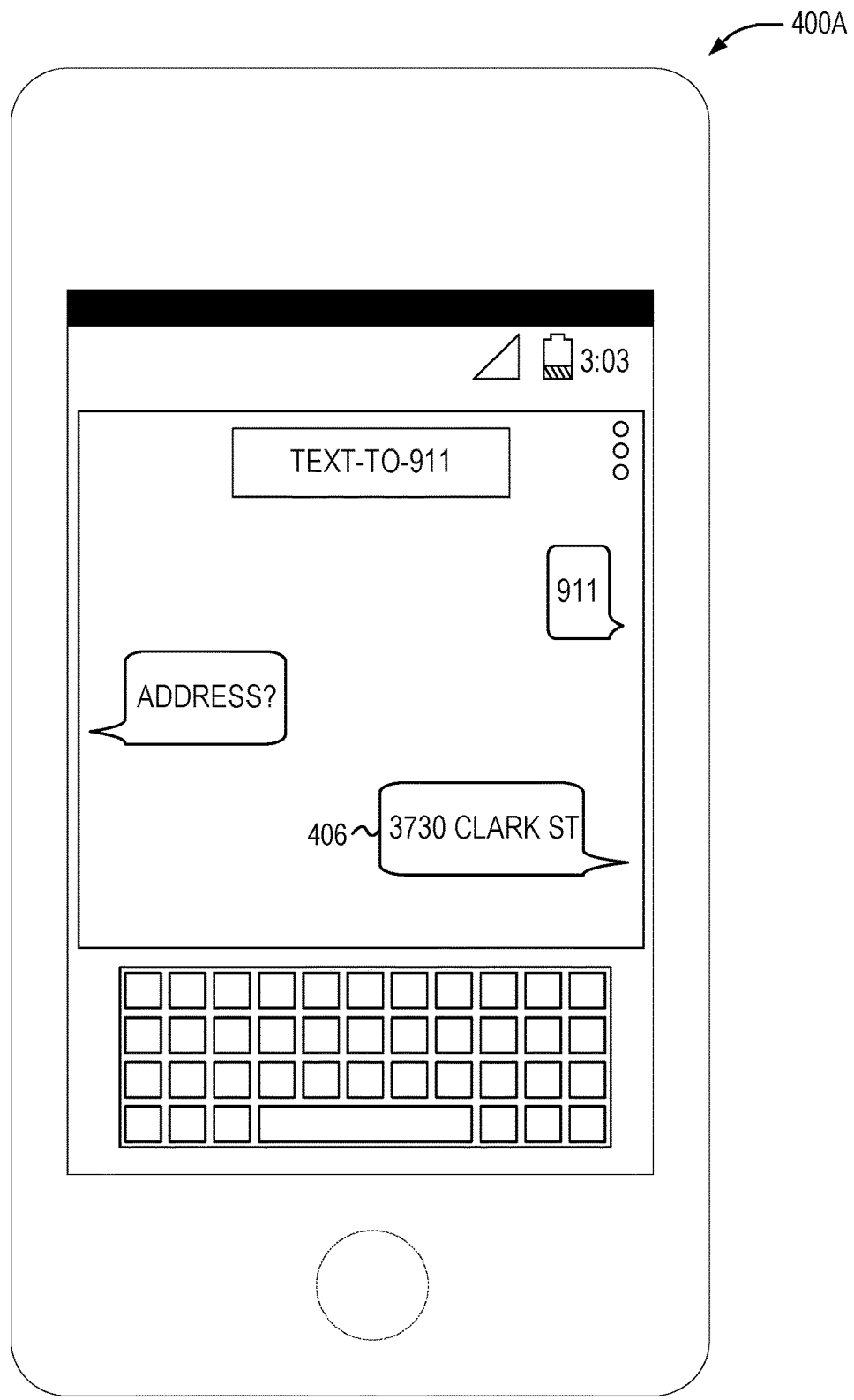
FIGS. 4A-4B illustrate an example mobile device for providing a suggested address using location data in an emergency text according to some examples of the present disclosure.
Figure 4B:
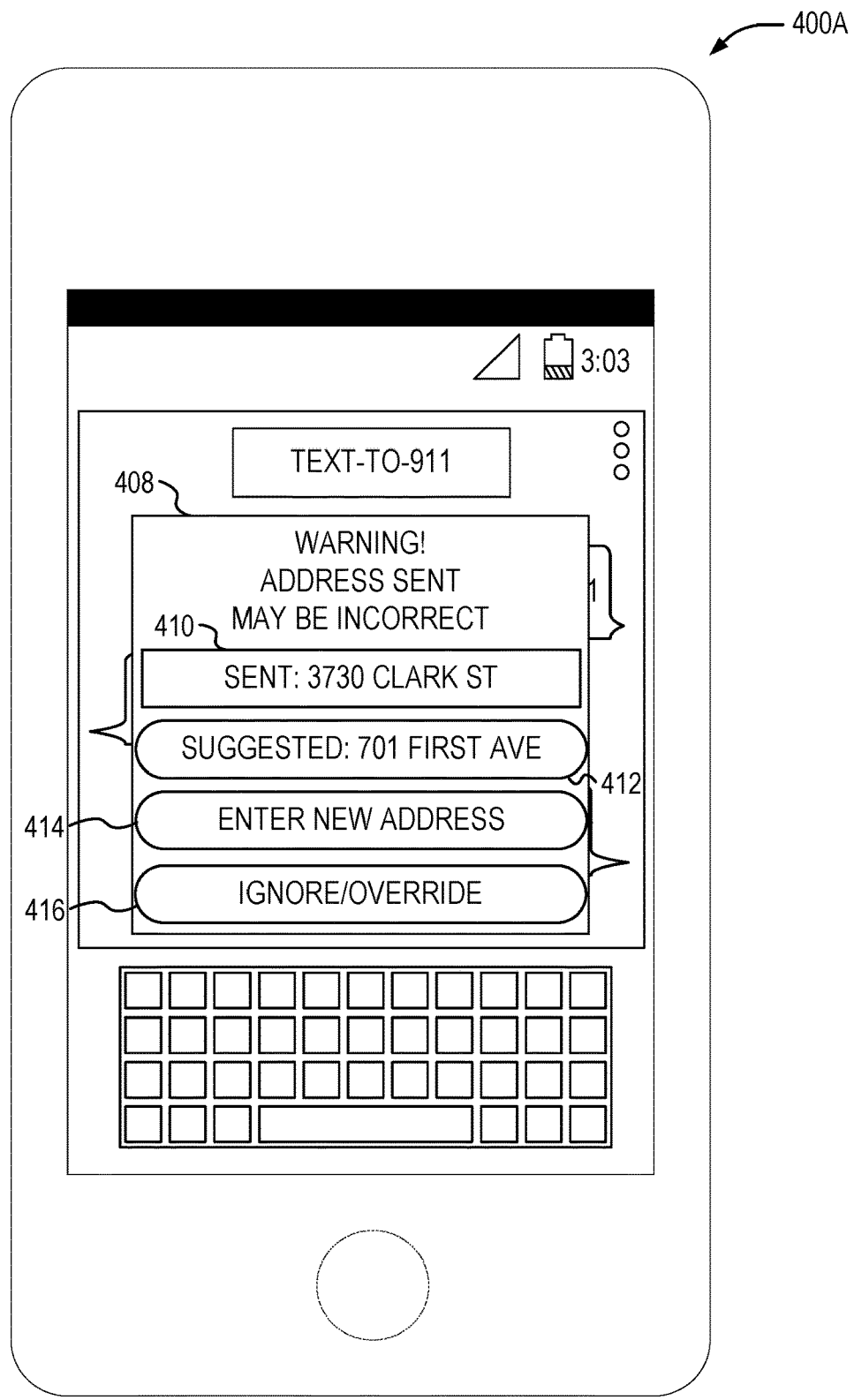

FIGS. 4A-4B illustrate an example mobile device for providing a suggested address using location data in an emergency text according to some examples of the present disclosure. FIG. 4A illustrates the mobile device in a state 400A after sending an address in an emergency service message thread (message 406). After the message 406 is sent, the mobile device may verify whether location data for the mobile device corresponds (or is in range/proximity) of the address sent in the message 406. When the address corresponds, the mobile device may do nothing or may generate or send a confirmation message (to the user, such as by displaying a confirmation, or in the emergency service message thread, such as automatically or with user confirmation).

When the address is suspected to be incorrect (e.g., is outside a range or proximity of the location data probable location) the mobile device may enter state 400B, and display a warning 408. The warning 408 may indicate with words or symbols that the address sent was likely incorrect. The warning 408 may include information regarding the sent address 410, a suggested address 412 (e.g., based on the location data automatically determined), an option to enter a new address 414, or an option 416 to ignore or override the warning. In an example, selection of one of these options may result in the action being taken automatically (for example, automatic updating of the address (e.g., sending the suggested address 412 when selected)), or may display a confirmation indication. Selection of the ignore or override option 416 may result in an additional warning that emergency services may not be able to find the user. When the enter new address option 414 is selected, the new address entered may be verified as well. In an example, a confidence level may be displayed (e.g., 90% likelihood that the mobile device is not at the address sent or 60% likelihood that the suggested address is correct). None of these options may prevent the user from entering a user selected address and sending it to emergency services (e.g., overriding all location data), because in some cases the location data may be incorrect or unreliable. In an example, the user may override the entire address entry dialog when the user is attempting to contact emergency services to a remote location.

Figure 5:
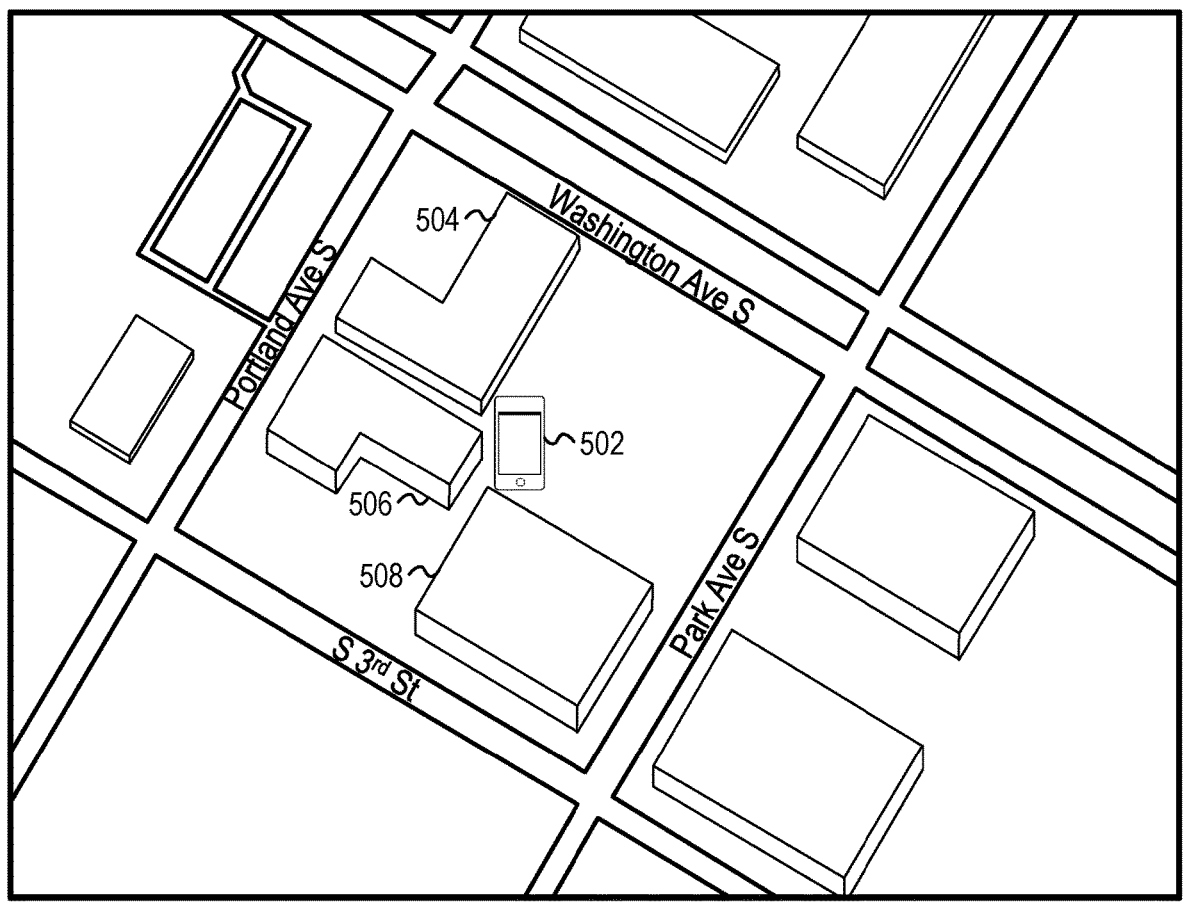
FIG. 5 illustrates a diagram of a map illustrating location information according to some examples of the present disclosure.

FIG. 5 illustrates a diagram of a map 500 illustrating location information according to some examples of the present disclosure. The map 500 shows a mobile device 502, along with a one or more likely locations (e.g., addresses) for example locations 504, 506, or 508. The map 500 is representative of various locations to show proximity and the potential for difficulty in determining an accurate address of the mobile device 502.

The location within the map 500 of the mobile device 502 may be determined using any of the techniques described herein (e.g., from an eNodeB, an access point, another device with a known location, a user entered address, GPS, etc.). The locations 504, 506, and 508 may, in an example, be determined as potential locations of the mobile device 502. One of the locations 504, 506, and 508 may be selected as a probable location of the mobile device 502 based on location data (e.g., a closest of the potential locations). The probable location of the mobile device 502 may be based on user information, such as a user entered address corresponding to one of the locations 504, 506, and 508 (e.g., location 506 is the user's home or place of work), past user interaction data (e.g., location 508 is stored in the mobile device 502 as a place the user has visited in the past, saved in a map app, or the like), user intent (e.g., location 504 is marked to be visited), or based on user data (e.g., location 506 is a saved address in a contacts list).

In the example discussed above with respect to FIGS. 4A-4B, one or more of the locations 504, 506, and 508 may be suggested when the mobile device 502 sends an address other than those corresponding to the locations 504, 506, and 508. In another example, when the mobile device 502 verifies (before or after sending) that an address selected by a user corresponds to one of the locations 504, 506, and 508, a confirmation message may be generated or sent automatically. The confirmation message may indicate that location data of the mobile device 502 confirms the user selected address.

In some examples, the map may be shown to a user and the user may be able to drag and drop the mobile device 502 to a correct location. The location the user dropped the mobile device 502 may be inserted into the text.

Figure 6:
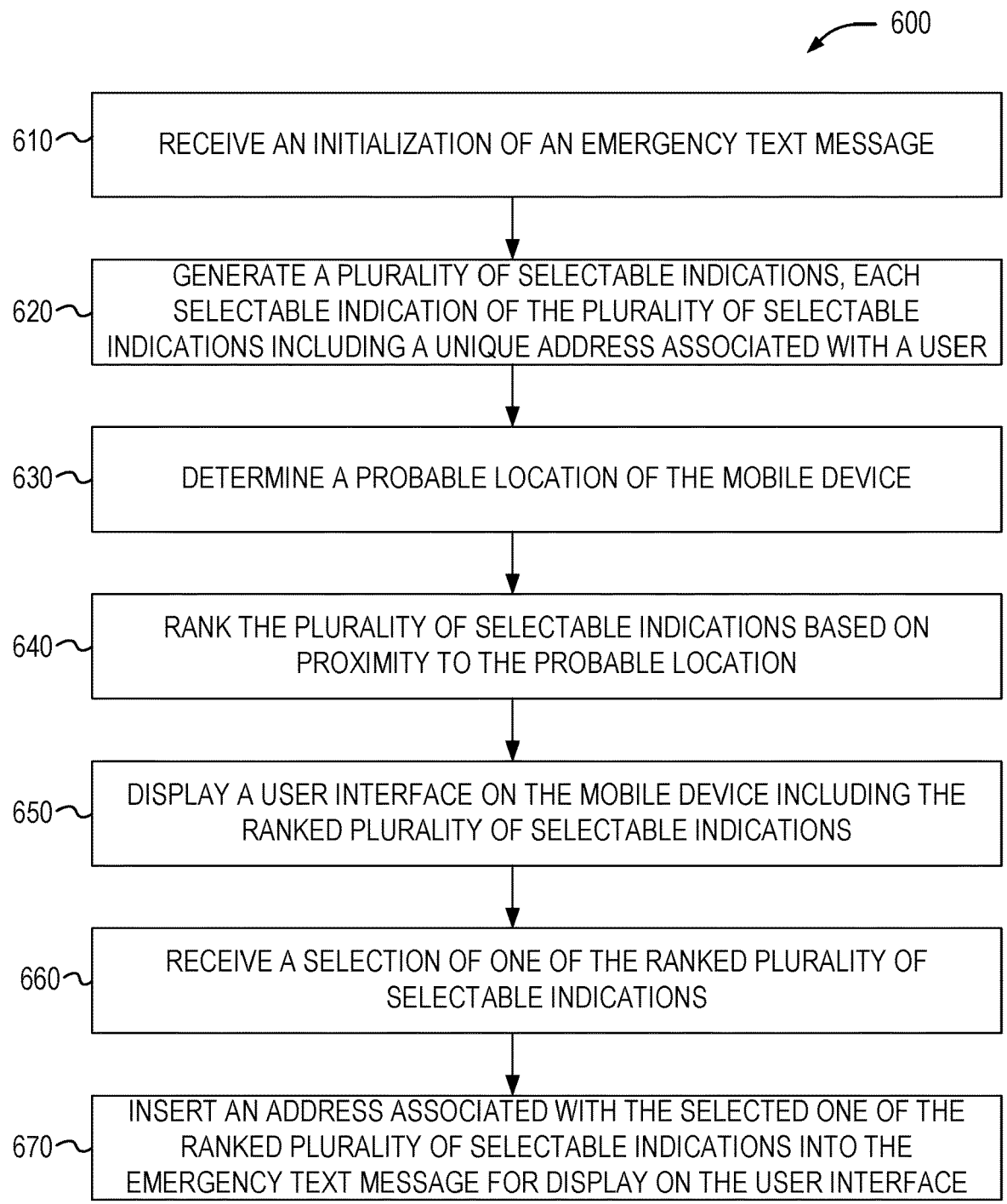
FIG. 6 illustrates a flowchart of a technique for providing an emergency text service on a mobile device according to some examples of the present disclosure.

FIG. 6 illustrates a flowchart of a technique 600 for providing an emergency text service on a mobile device according to some examples of the present disclosure. The technique 600 may be performed using a processor or processors of the mobile device (e.g., as discussed in further detail below with respect to FIG. 7).

The technique 600 includes an operation 610 to receive an initialization of an emergency text message, for example by receiving an indication that an emergency text message has been started.

The technique 600 includes an operation 620 to generate a plurality of selectable indications, each selectable indication of the plurality of selectable indications including a unique address associated with a user. In an example, the unique address may be derived from a saved place or a previously visited place on a map app. In an example, at least one of the selectable indications of the plurality of selectable indications includes a unique address entered by the user. The technique 600 includes an operation 630 to determine a probable location of the mobile device. Operation 630 may include using at least one of Global Positioning System (GPS) or an address of a device connected to the mobile device including an access point (AP) or an Evolved Terrestrial Radio Access Network (E-UTRAN) node B (eNodeB). In an example, operation 630 includes querying a nearby device in proximity to the mobile device to determine the probable location.

The technique 600 includes an operation 640 to rank the plurality of selectable indications based on proximity to the probable location. Operation 640 may include adding a home address of the user above the ranked plurality of selectable indications.

The technique 600 includes an operation 650 to display a user interface on the mobile device including the ranked plurality of selectable indications. The ranked plurality of selectable indications may be displayed on the user interface using color coding including for example, a first color for an address closest to the probable location of the mobile device and a second color for at least one other address.

The technique 600 includes an operation 660 to receive a selection of one of the ranked plurality of selectable indications.

The technique 600 includes an operation 670 to insert an address associated with the selected one of the ranked plurality of selectable indications into the emergency text message for display on the user interface. After operation 670, the technique 600 may include automatically sending the emergency text message. In an example, after sending the emergency text message, the technique 600 may include an operation to determine the address sent in the emergency text message is likely incorrect based on the probable location of the mobile device. The technique 600 may further include an operation to display a prompt asking whether the sent address is incorrect. The technique 600 may further include an operation to, in response to receiving confirmation that the sent address is incorrect, display at least one address other than the sent address in the user interface.

The technique 600 may further include an operation to, prior to inserting the address into the emergency text message, verifying that the probable location corresponds to the address. The technique 600 may further include an operation to update addresses associated with the plurality of selectable indications based on a change in the probable location of the mobile device, including, for example, re-ranking the addresses, replacing the addresses with new addresses, or the like.

Figure 7:
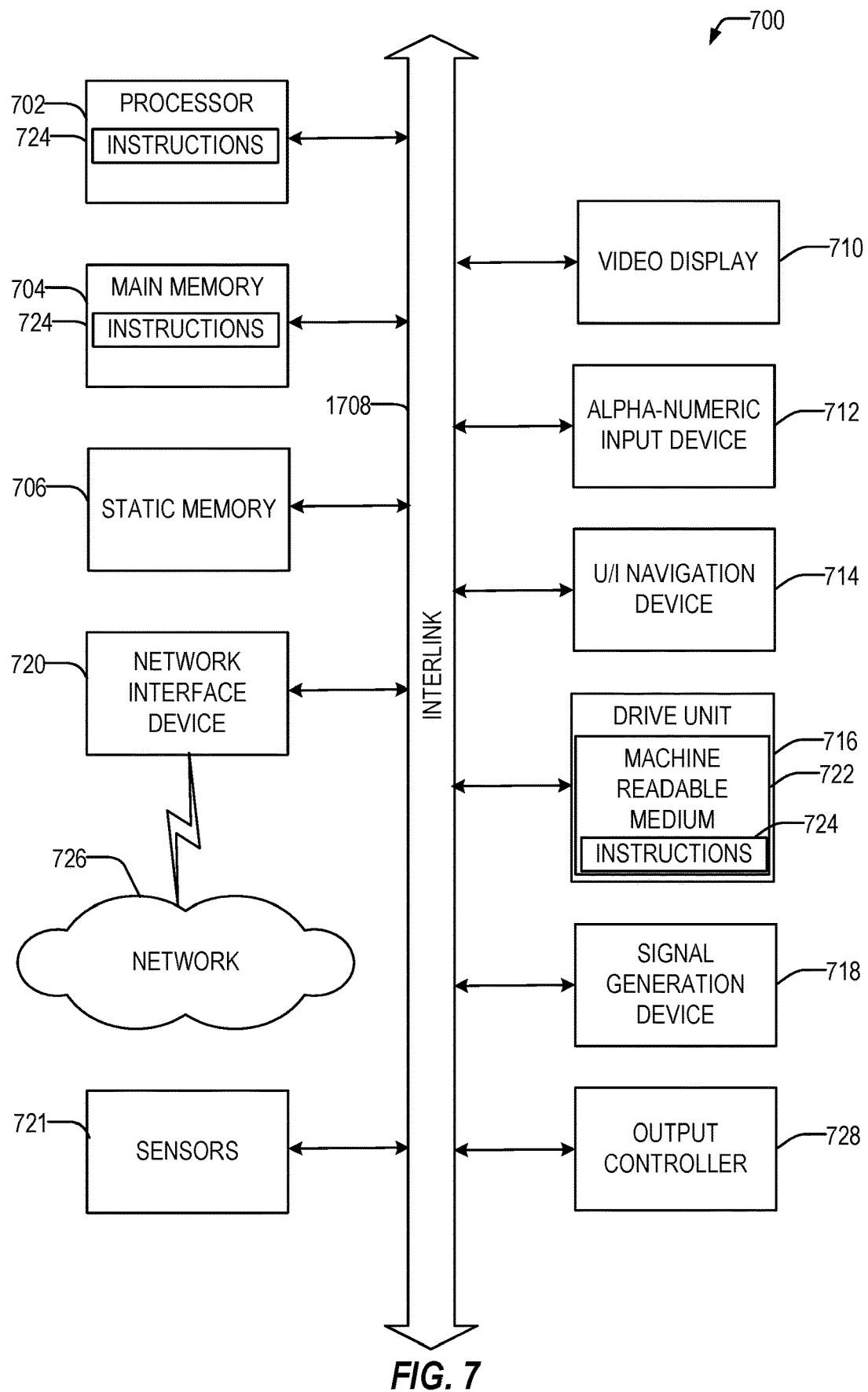
FIG. 7 illustrates a block diagram of an example machine which may implement one or more of the techniques discussed herein according to some examples of the present disclosure.

FIG. 7 illustrates a block diagram of an example machine 700 which may implement one or more of the techniques (e.g., methodologies) discussed herein according to some examples of the present disclosure. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be configured to perform the methods of FIG. 6. The machine 700 may be configured to provide the GUIs of FIG. 1A-1D, 2-3, or 4A-4B. In an example, the machine 700 may act as a peer machine in peer-to-peer (P2P) (or other distributed) network environment. The machine 700 may be a user device, a remote device, a second remote device or other device which may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine readable media. In some examples, machine readable media may include machine readable media that is not a transitory propagating signal.

The instructions 724 may further be transmitted or received over a communications network 726 using a transmission medium via the network interface device 720. The machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Example 1 is a method of providing an emergency text service on a mobile device, the method comprising: receiving an indication that an emergency text message has been started; generating, using at least one processor of the mobile device, a plurality of selectable indications, each including a unique address associated with a user; determining a probable location of the mobile device; ranking the plurality of selectable indications based on proximity of the mobile device to the probable location; displaying a user interface on the mobile device including the ranked plurality of selectable indications; receiving a selection of one of the ranked plurality of selectable indications; and inserting an address associated with the selected one of the ranked plurality of selectable indications into the emergency text message for display on the user interface.

In Example 2, the subject matter of Example 1 includes, prior to inserting the address into the emergency text message, verifying that the probable location corresponds to the address.

In Example 3, the subject matter of Examples 1-2 includes, wherein ranking the plurality of selectable indications includes adding a home address of the user above the ranked plurality of selectable indications.

In Example 4, the subject matter of Examples 1-3 includes, wherein at least one of the selectable indications of the plurality of selectable indications includes a unique address entered by the user.

In Example 5, the subject matter of Examples 1-4 includes, wherein determining the probable location of the mobile device includes using at least one of Global Positioning System (GPS) or an address of a device connected to the mobile device including an access point (AP) or an Evolved Terrestrial Radio Access Network (E-UTRAN) node B (eNodeB).

In Example 6, the subject matter of Examples 1-5 includes, wherein determining the probable location of the mobile device includes querying a nearby device in proximity to the mobile device.

In Example 7, the subject matter of Examples 1-6 includes, wherein the unique address is derived from a saved place or a previously visited place on a map app.

In Example 8, the subject matter of Examples 1-7 includes, after inserting the address, automatically sending the emergency text message.

In Example 9, the subject matter of Example 8 includes, wherein after sending the emergency text message, the method further comprises: determining that the address sent in the emergency text message is likely incorrect based on the probable location of the mobile device; displaying a prompt asking whether the sent address is incorrect; and in response to receiving confirmation that the sent address is incorrect, displaying at least one address other than the sent address in the user interface.

In Example 10, the subject matter of Examples 1-9 includes, wherein the ranked plurality of selectable indications are displayed on the user interface using color coding including a first color for an address closest to the probable location of the mobile device and a second color for at least one other address.

In Example 11, the subject matter of Examples 1-10 includes, updating addresses associated with the plurality of selectable indications based on a change in the probable location of the mobile device.

Example 12 is a mobile device for providing an emergency text service, the mobile device comprising: a display; one or more hardware processors; a memory, storing instructions, which when executed, cause the one or more hardware processors to perform operations comprising: receiving an indication that an emergency text message has been started; generating a plurality of selectable indications, each including a unique address associated with a user; determining a probable location of the mobile device; ranking the plurality of selectable indications based on proximity of the mobile device to the probable location; outputting a user interface to the display, the user interface including the ranked plurality of selectable indications; receiving a selection of one of the ranked plurality of selectable indications; and inserting an address associated with the selected one of the ranked plurality of selectable indications into the emergency text message for display on the user interface.

In Example 13, the subject matter of Example 12 includes, wherein the instructions further cause the one or more hardware processors to perform operations comprising: verifying, prior to inserting the address into the emergency text message, that the probable location corresponds to the address.

In Example 14, the subject matter of Examples 12-13 includes, wherein ranking the plurality of selectable indications includes adding a home address of the user above the ranked plurality of selectable indications.

In Example 15, the subject matter of Examples 12-14 includes, wherein at least one of the selectable indications of the plurality of selectable indications includes a unique address entered by the user.

In Example 16, the subject matter of Examples 12-15 includes, wherein determining the probable location of the mobile device includes using at least one of Global Positioning System (GPS) or an address of a device connected to the mobile device including an access point (AP) or an Evolved Terrestrial Radio Access Network (E-UTRAN) node B (eNodeB).

In Example 17, the subject matter of Examples 12-16 includes, wherein determining the probable location of the mobile device includes querying a nearby device in proximity to the mobile device.

In Example 18, the subject matter of Examples 12-17 includes, wherein the unique address is derived from a saved place or a previously visited place on a map app.

Example 19 is an apparatus for providing an emergency text service, the apparatus comprising: means for receiving an indication that an emergency text message has been started; means for generating a plurality of selectable indications, each including a unique address associated with a user; means for determining a probable location of the apparatus; means for ranking the plurality of selectable indications based on proximity of the apparatus to the probable location; means for displaying a user interface on the apparatus including the ranked plurality of selectable indications; means for receiving a selection of one of the ranked plurality of selectable indications; and means for inserting an address associated with the selected one of the ranked plurality of selectable indications into the emergency text message for display on the user interface.

In Example 20, the subject matter of Example 19 includes, means for, prior to inserting the address into the emergency text message, verifying that the probable location corresponds to the address.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method of providing an emergency text service on a device, the method comprising:
   receiving an indication that an emergency text message has been started on the device;
   responsive to the received indication:
      generating, using at least one processor of the device, a plurality of selectable indications, each selectable indication of the plurality of selectable indications including a unique address associated with a user;
      determining a probable location of the device based on user data or location data of the device;
      ranking the plurality of selectable indications based on a proximity of each respective unique address to the probable location; and
      displaying a user interface on the device including displaying selectable indications of the ranked plurality of selectable indications;
   receiving, via an interaction with the user interface, a user a selection of one of the selectable indications; and
   responsive to the received user selection, inserting an address associated with the selected one of the selectable indications into the emergency text message for display on the user interface on the device.

2. The method of claim 1, further comprising, prior to inserting the address into the emergency text message, verifying that the probable location corresponds to the address.

3. The method of claim 1, wherein ranking the plurality of selectable indications includes adding a home address of the user above the ranked plurality of selectable indications.

4. The method of claim 1, wherein at least one of the selectable indications of the plurality of selectable indications includes a unique address entered by the user.

5. The method of claim 1, wherein determining the probable location of the device includes using at least one of Global Positioning System (GPS) or an address of a device connected to the device including an access point (AP) or an Evolved Terrestrial Radio Access Network (E-UTRAN) node B (eNodeB).

6. The method of claim 1, wherein determining the probable location of the device includes querying a nearby device in proximity to the device.

7. The method of claim 1, wherein the unique address is derived from a saved place or a previously visited place on a map app.

8. The method of claim 1, further comprising, after inserting the address, automatically sending the emergency text message.

9. The method of claim 8, wherein after sending the emergency text message, the method further comprises:

determining that the address sent in the emergency text message is likely incorrect based on the probable location of the device;

displaying a prompt asking whether the sent address is incorrect; and in response to receiving confirmation that the sent address is incorrect, displaying at least one address other than the sent address in the user interface.

10. The method of claim 1, wherein the ranked plurality of selectable indications are displayed on the user interface using color coding including a first color for an address closest to the probable location of the device and a second color for at least one other address.

11. The method of claim 1, further comprising updating addresses associated with the plurality of selectable indications based on a change in the probable location of the device.

12. The method of claim 1, wherein displaying the user interface inludes displaying an indication of a respective ranking of the ranked plurality of selectable indications.

13. A device for providing an emergency text service, the device comprising:

a display;

one or more hardware processors;

a memory, storing instructions, which when executed, cause the one or more hardware processors to perform operations comprising:

receiving an indication that an emergency text message has been started on the device;

responsive to the received indication:

generating a plurality of selectable indications, each selectable indication of the plurality of selectable indications including a unique address associated with a user;

determining a probable location of the device based on user data or location data of the device;

ranking the plurality of selectable indications based on a proximity of each respective unique address to the probable location; and outputting a user interface to the display, the user interface including selectable indications of the ranked plurality of selectable indications;

receiving, via an interaction with the user interface, a user a selection of one of the selectable indications; and responsive to the received user selection, inserting an address associated with the selected one of the selectable indications into the emergency text message for display on the user interface on the display.

14. The device of claim 13, wherein the instructions further cause the one or more hardware processors to perform operations comprising: verifying, prior to inserting the address into the emergency text message, that the probable location corresponds to the address.

15. The device of claim 13, wherein ranking the plurality of selectable indications includes adding a home address of the user above the ranked plurality of selectable indications.

16. The device of claim 13, wherein at least one of the selectable indications of the plurality of selectable indications includes a unique address entered by the user.

17. The device of claim 13, wherein determining the probable location of the device includes using at least one of Global Positioning System (GPS) or an address of a device connected to the device including an access point (AP) or an Evolved Terrestrial Radio Access Network (E-UTRAN) node B (eNodeB).

18. The device of claim 12, wherein determining the probable location of the device includes querying a nearby device in proximity to the device.

19. The device of claim 12, wherein the unique address is derived from a saved place or a previously visited place on a map app.

20. An apparatus for providing an emergency text service, the apparatus comprising:

means for receiving an indication that an emergency text message has been started on the apparatus;

responsive to the received indication:

means for generating a plurality of selectable indications, each selectable indication of the plurality of selectable indications including a unique address associated with a user;

means for determining a probable location of the apparatus based on user data or location data of the apparatus;

means for ranking the plurality of selectable indications based on a proximity of each respective unique address to the probable location; and means for displaying a user interface on the apparatus including displaying selectable indications of the ranked plurality of selectable indications;

means for receiving, via an interaction with the user interface, a user selection of one of the selectable indications; and responsive to the received user selection, means for inserting an address associated with the selected one of the selectable indications into the emergency text message for display on the user interface on the apparatus.

21. The apparatus of claim 20, further comprising, means for, prior to inserting the address into the emergency text message, verifying that the probable location corresponds to the address.

* * * * *